United States Patent [19]

Wright

[11] Patent Number: 4,831,218
[45] Date of Patent: May 16, 1989

[54] UNIVERSAL BINARY KEYBOARD SYSTEM

[75] Inventor: Forrest S. Wright, Rochester, Mich.

[73] Assignee: Binagraphics, Inc., Rochester, Mich.

[21] Appl. No.: 7,020

[22] Filed: Jan. 27, 1987

Related U.S. Application Data

[63] Continuation-in-part of Ser. No. 655,619, Sep. 28, 1984, abandoned.

[51] Int. Cl.⁴ .................. H01H 3/00; H01H 13/70
[52] U.S. Cl. ......................... 200/5 A; 200/339
[58] Field of Search ............ 200/5 A, 5 R, 159 B, 200/339, 340; 235/145 R; 84/423

[56] References Cited

U.S. PATENT DOCUMENTS

| | | | |
|---|---|---|---|
| 3,022,878 | 2/1962 | Seibel et al. | 400/479 |
| 3,215,246 | 11/1965 | Zanaboni | 400/102 |
| 3,225,883 | 12/1965 | Ayres | 400/94 |
| 3,428,747 | 2/1969 | Alferieff | 178/17 R |
| 3,560,964 | 2/1971 | Bedell et al. | 340/365 VL |
| 3,980,823 | 9/1976 | Howard | 178/30 |
| 4,042,777 | 8/1977 | Bequaert et al. | 178/79 |
| 4,067,431 | 1/1978 | Whitaker | 400/485 |
| 4,359,613 | 11/1982 | Rooney | 200/5 R |
| 4,381,502 | 4/1983 | Prame | 340/365 R |
| 4,386,347 | 5/1983 | Cutler et al. | 340/712 |
| 4,486,637 | 12/1984 | Chu | 200/5 A X |
| 4,502,038 | 2/1985 | Lowenthal et al. | 340/365 S |
| 4,520,240 | 5/1985 | Swindler | 200/5 R |
| 4,618,744 | 10/1986 | Pope et al. | 200/5 A |

Primary Examiner—J. R. Scott
Attorney, Agent, or Firm—Cullen, Sloman, Grauer, Scott & Rutherford

[57] ABSTRACT

A keyboard apparatus including a plurality of nested, identically configured, keys for use in computer keyboards, typewriters, electronic switches and the like. The keyboard apparatus preferably includes a chassis having a plurality of alignment pins to receive a plurality of nested keys and a plurality of electronic switches to be activated by the keys.

4 Claims, 10 Drawing Sheets

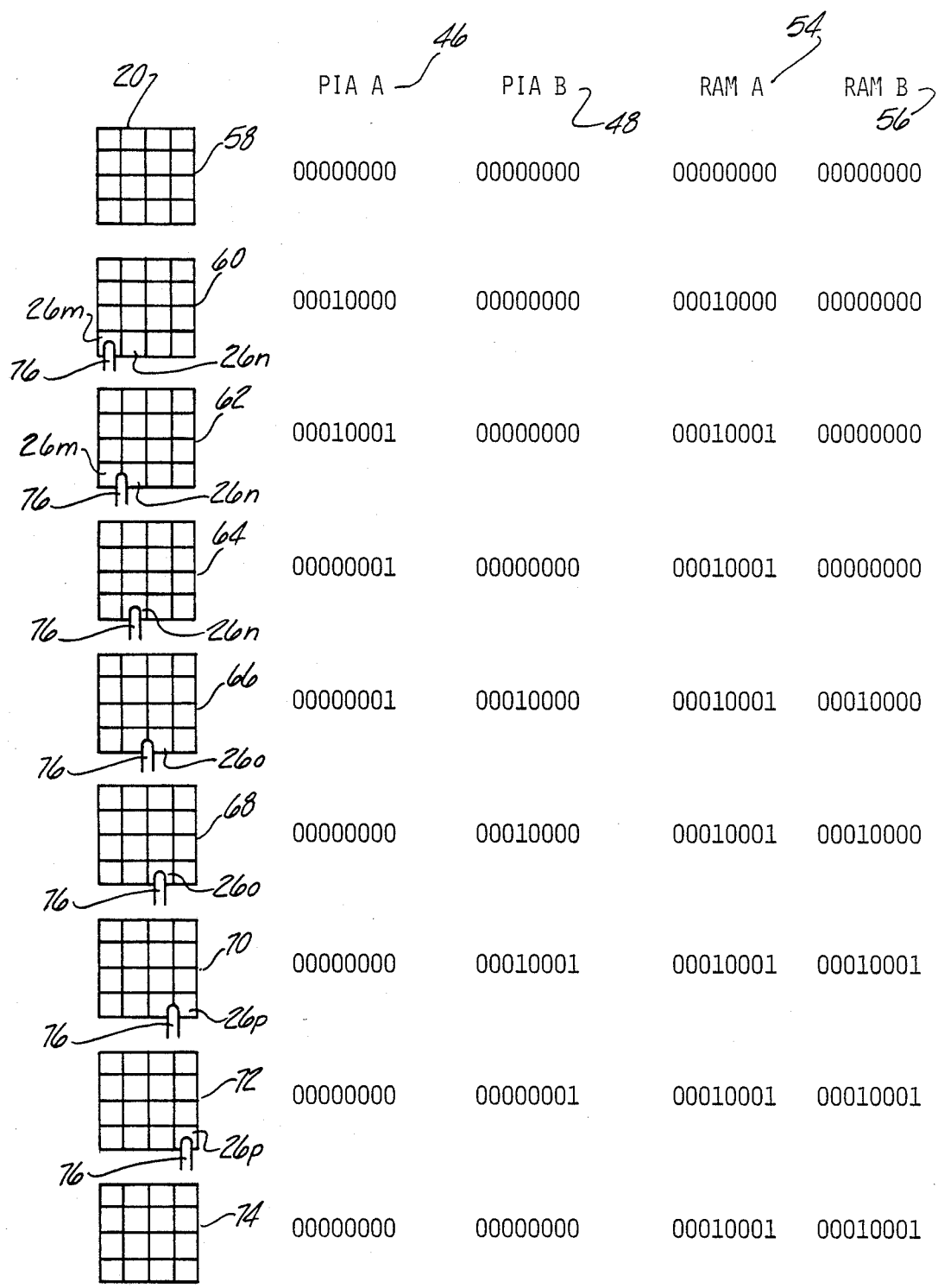
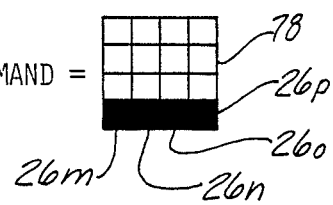
Fig-2

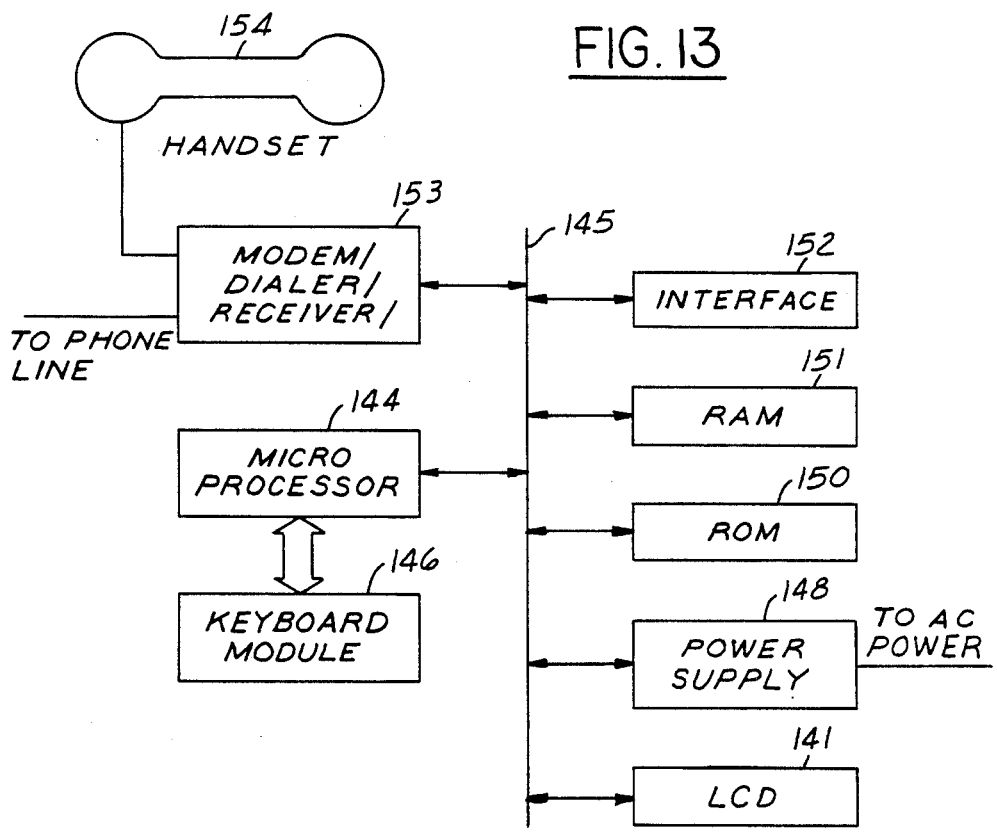
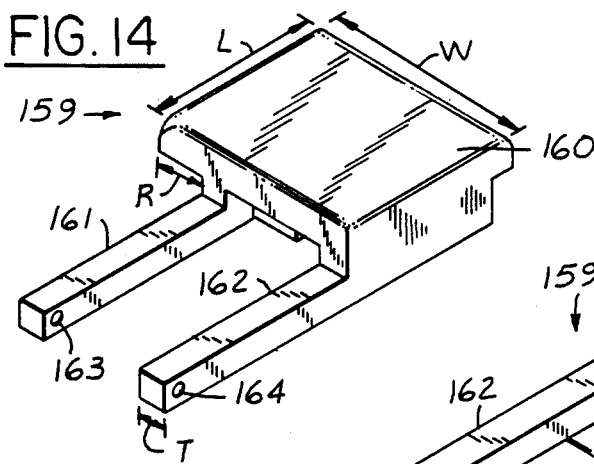
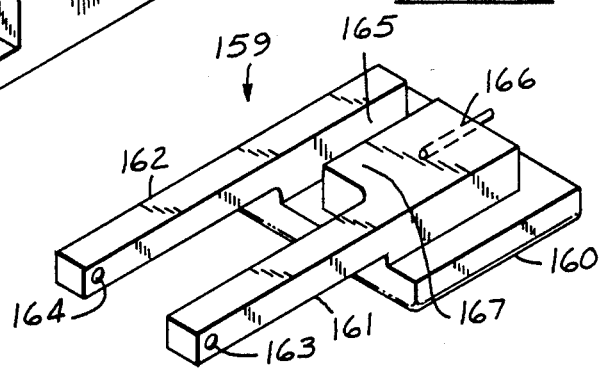

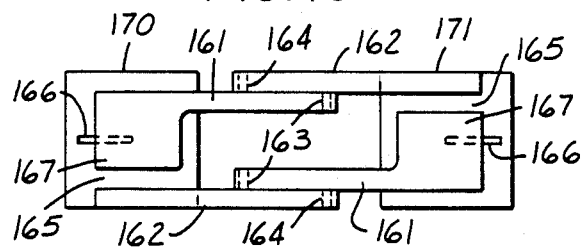
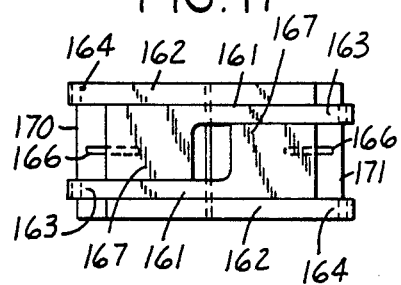
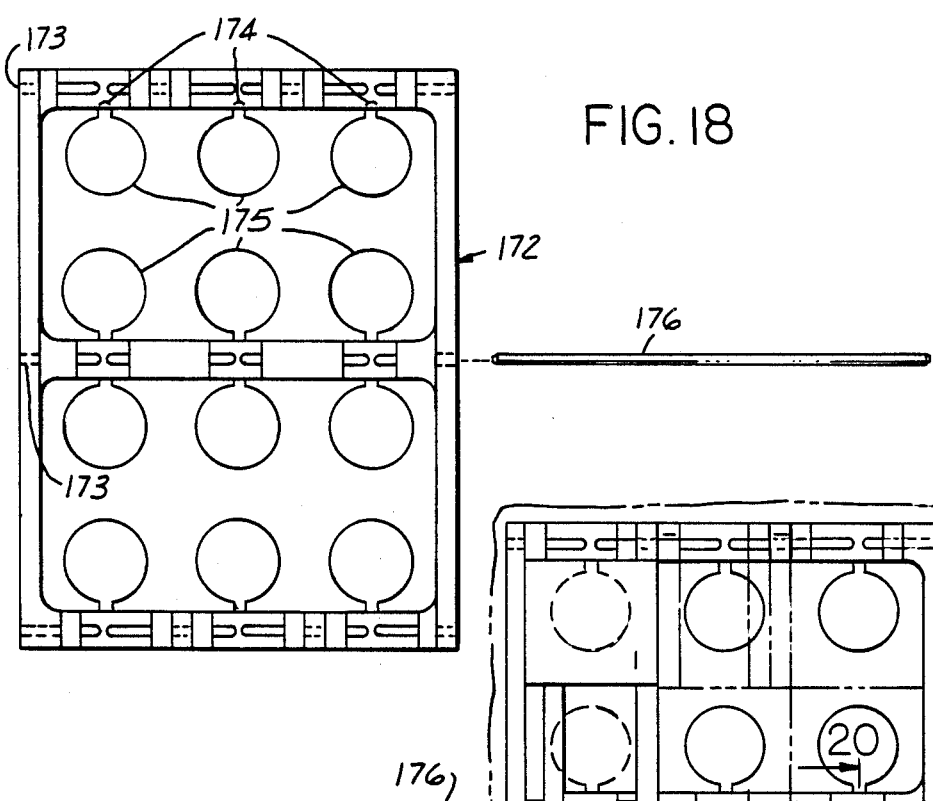
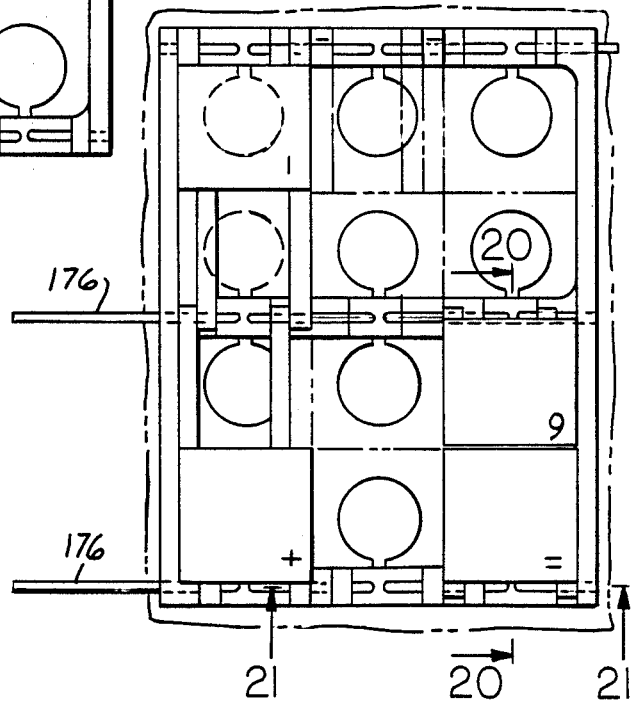

UNIVERSAL BINARY KEYBOARD SYSTEM

The present application is a continuation-in-part of now abandoned application Ser. No. 655,619, which was filed Sept. 28, 1984.

TECHNICAL FIELD

The present invention broadly relates to information processing systems, and deals more particularly with a system including an alphanumeric keyboard system for generating and displaying information.

BACKGROUND ART

With the rapid development of data processing and information systems, man-machine interface devices are becoming increasingly important. For example, in many applications the efficiency with which an operator can generate and input data to an information processing system is severely limited due to the long-used, conventional keyboards which are the most common form of human operated data input devices.

Conventional data processing keyboards, which have their origins in the alphanumeric key set used in typewriters, have been modified in various ways in order to increase their efficiency and versatility. Such improvements sometimes take the form of additional, special function keys, thus increasing the complexity and size of the keyboard. The rapid miniaturization of data processing systems afforded by microcomputers and very large scale integrated circuits (VLSI's) has vastly increased the applications for microprocessor-based systems; however, the more complex keyboards required to perform complex data input functions for these applications are sometimes unsuitable because of their size and/or complexity.

Others in the past have recognized the need for flexible keyboards which may be employed in various modes to suit different applications. For example, a removable overlay is sometimes placed over the keyboard which has indicia thereon associated with the keys. By employing different overlays, the keyboard can be employed to generate different sets of information.

One limitation of prior alphanumeric keyboards lies in the fact that they are dependent upon the operator's use of an alphabetic-type keyboard to generate information in which each letter of the alphabet has associated therewith a particular key to be actuated. This type of keyboard not only requires a relatively large amount of space which may be impractical to provide in many applications, but is also rather illogical in layout, is not easy to learn for the layperson, and is relatively inefficient in generating information since the keys must be sequentially actuated.

It is therefore a primary object of the present invention to overcome each of the deficiencies inherent in the prior art devices mentioned above.

SUMMARY OF THE INVENTION

In accordance with one aspect of the invention, a keyboard is provided having a relatively small number of keys, preferably arranged in a 4×4 matrix which not only allows generation of data corresponding to the entire alphabet, but also permits generation of arabic numbers, punctuation and complex functions such as square root and trigonomic functions. In one mode of operation, one or more keys are actuated as groups to generate information corresponding to either upper or lower case alphabetic letters, complex mathematical functions, punctuation or entire words. In another mode of operation, the keys may be employed as a conventional ten-digit calculator keyboard. In one form of the keyboard, the keys are defined by touch-sensitive switches which are operated in a first mode by touching the surfaces of the keys; groups of the keys may be successively rapidly operated by merely sliding a finger over the surface of the keys. In a second mode of operation for generating numerals, the keys are depressed to generate a signal corresponding to the particular key that is depressed. The system further includes a microprocessor-controlled accumulator which accumulates data bits for each key or group of keys that is depressed in order to form a data word corresponding to the information to be generated. Each key or group of keys corresponding to the information to be generated is actuated during a selection period in which at least one of the keys of the group is depressed at all times. The microprocessor determines when an entry is completed by sensing disengagement of the keys by the operator's fingers and loads the data word into memory at the end of each selection period.

In a preferred form of the invention, a coding key which associates the information to be generated with the group of keys required to generate the information is disposed in proximity to the keyboard to provide a ready reference for the operator. A conventional LED or LCD display, preferably of a matrix type, provides a visual display of the generated information.

In an alternate embodiment, the keyboard is combined with a changeable display screen which displays a mode selection menu consisting of a matrix for discrete selection blocks which correspond in position to and are visually associable with the keys of a keyboard positioned in side-by-side relationship to the screen.

In another preferred embodiment of the invention, the keyboard system is selectively operable in both segregated and nonsegregated modes. In a segregated mode, different subsets of keys are used to generate different character sets. The various subsets of keys may be distinguished by means of color, slight physical separation or by merely designated specific columns to be included in a particular subset. In one example of a segregated mode, two columns of a 3×4 matrix may be employed to generate alphabetic characters while the remaining column of the keypad matrix may be used to generate numeric characters. An example of a nonsegregated mode of keyboard operation is the standard calculator or telephone type of keypad.

The system is useful in any application in which information is required to generated, such as small computers, locking systems, telephone dialing controllers and the like. The system can be employed in connection with the alphabets of various languages, is compact, simple and relatively inexpensive to manufacture. The keyboard codes are easy to learn because of their logical basis. The system can be programmed by the user and can be operated by touch or "feel" without the need for looking at the keys.

These, and further advantages of the present system, will be made clear, or will become apparent during the course of the following description of a preferred embodiment of the present invention.

BRIEF DESCRIPTION OF THE DRAWINGS

In the drawings, which form an integral part of the specification and are to be read in conjunction therewith, and in which like reference numerals are employed to designate identical components in the various views:

FIG. 2 is a diagrammatic view of the keyboard of the present invention depicting the bits stored in the electronic registers and memories as the keys in a code group thereof are successively actuated to generate a desired piece of information.

FIG. 13 is a block circuit diagram of the device of FIG. 12;

FIG. 14 is a top; perspective view of a key structure useful in the present invention;

FIG. 15 is a bottom perspective view of the key structure of FIG. 14;

FIG. 16 is a plan view of a pair of keys lined up for nesting;

FIG. 17 is a plan view of a nested pair of keys;

FIG. 18 is a plan view of a preferred embodiment of a keypad chassis;

FIG. 19 is a plan view of a partially assembled keypad;

DESCRIPTION OF THE PREFERRED EMBODIMENT

Figure 1:
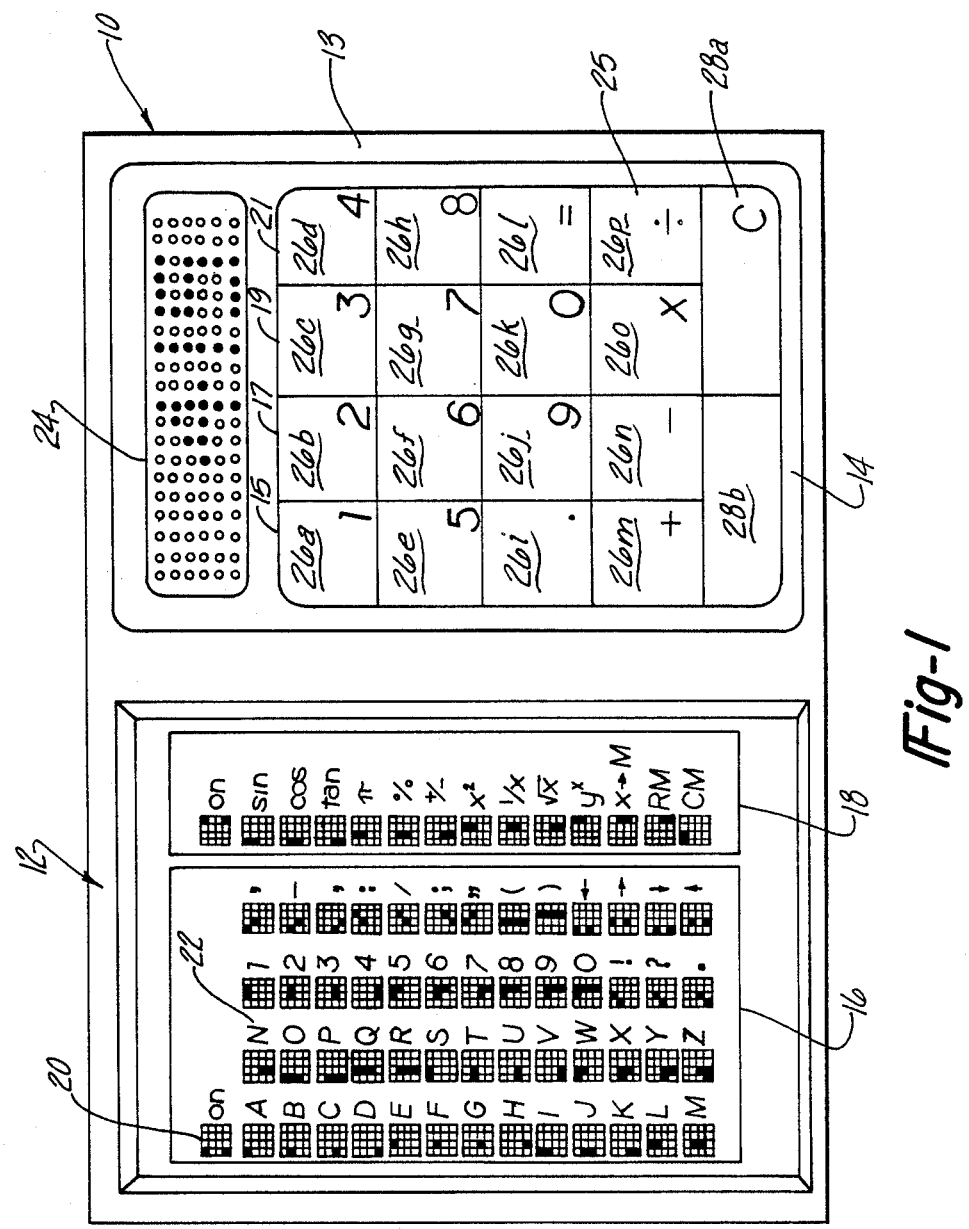
FIG. 1 is a plan view of a system for generating information including a keyboard which forms one embodiment of the present invention.

Attention is first directed to FIG. 1 which depicts a keyboard system 10 for generating information which generally comprises a code table 12 and a keyboard system 14 disposed in proximity to the code table 12, as by mounting the keyboard system 14 and code table 12 on a suitable base 13.

The keyboard system 10 includes a 4×4 matrix 25 of actuable keys 26a–26p which may have indicia thereon such as the numbers 0 through 9 and arithmetic functions, as are used in a common calculator keyboard. Additionally, a pair of control keys 28a, 28b are disposed adjacent the bottom of the matrix 25, respectivley below two adjacent columns 15, 17, and 19, 21 of the keys 26. An LC or LED display matrix 24 consisting of aligned rows and columns of energizable pixels is provided to visually display information including numerals, letters and symbols, which are generated by the matrix 25 of keys 26. The keys 26 may be connected to any of various types of conventional switches such as single pole, single throw momentary open switches that may be mechanical or electronic. As will become later apparent, the keys 26 may be employed to generate information including alphanumeric, graphics, complex mathematical functions and even entire words. The keys 26 are each preferably formed with a depressed face in order to outline the placement of the keys relative to each other and thereby aid in tactile location of the keys by the user.

The code table 12 includes a first portion 16 which consists of a plurality of blocks 20 each divided into a 4×4 matrix of squares, each block 20 corresponding to a particular character of function 22 to be generated. The squares of each block 20 correspond in position to the matrix 25 of keys 26, and the squares that are filled in correspond to the particular keys 26 which must be actuated in order to generate the corresponding character 22. As particularly shown in FIG. 1, it may be noted that the capital letters A through Z shown in the first two columns of blocks 20 are formed by actuating a key or a group of keys in the first two columns 15, 17 of the matrix 25. Each of these letters may be also generated in lower case form by actuating the same pattern of keys, but using columns 19 and 21 of the matrix 25. Additionally, signs and punctuation, as well as numbers may be generated by actuating the key or group of keys indicated in the corresponding blocks 20 of the alphanumeric portion 16 of the code table 12. Finally, complex mathematical functions indicated at 18 can also be generated in the same manner.

As seen in the alphanumeric portion 16 of the code table 12, a logical progression exists in the manner in which the keys 26 are actuated to form the corresponding letters of the alphabet, thus making this coding system particularly easy to learn. As indicated in FIG. 1, there is progressive positioning of the activated keys 26 in the matrix 25 in the sequence of the letters of the alphabet, this progression being repeated with a doubling, then tripling in the vertically aligned direction and then to a doubling in the horizontal position and finally to double-space in both the horizontal and vertical positions. Similarly, a logical progression in the coding pattern exists for the arabic numbers, symbols and complex mathematical functions. It should be noted that the coding patterns for producing the arabic numbers is confined to the two center columns 17, 19 in order to easily distinguish the numbers from the alphabetic characters. It may further be appreciated that there is provided ready identification of the individual digital patterns since there is no visual ambiguity involved. The human observer may readily discriminate between any patterns based upon the 4×4 matrix 25. Yet, at the same time, this arrangement provides for a large number of potential combinations of spaced in the 4×4 matrix 25 to enable general purpose encoding of information. In fact, the large number of digital patterns possible with this coding arrangement enables direct coding of entire words if desired.

Depending on the programming of the related microprocessor to which the system 14 is connected, the control keys 28a, 28b may be respectively employed to shift the characters either right or left on the display 24, or may be used to switch the function of the matrix keys 25 from a first mode of operation wherein actuation of the keys 25 in accordance with the code table 12 results in generation of the corresponding character, word or function, to a second mode of operation in which the matrix 25 is used as a conventional calculator keyboard. In use, the characters or other information are generated by actuating the keys 26 which correspond to the code for that character or item of information; the keys 26 for a character may be sequentially or simultaneously depressed. Actuation of the keys 26 for the code results in the corresponding character being displayed on the display 24 or results in the corresponding function being performed.

From the foregoing, it is apparent that the present invention provides a novel method of generating information characters in which a plurality of matrices are provided, each including identical rows and columns of locations in which humanly-perceivable bits of information may be placed. Bits of humanly-perceivable information are placed in at least certain of the bit storage locations of each of the matrices, the pattern of bits placed in each of the matrices being unique and identifying a unique information character to be generated. A plurality of actuatable keys are provided which are respectively associated with the bit storage locations of the matrices and are spatially arranged in an array of rows and columns corresponding to the rows and columns of the matrices. Each character is then generated by actuating the keys in the array thereof corresponding in spatial relationship to the storage locations of the associated matrix in which information bits are stored. The matrices are provided by forming a grid of intersecting lines defining squares, each square corresponding to a bit storage location and bits of information are stored in the bit storage locations by altering a visual characteristic of the square, as by filling it in.

Figure 3:
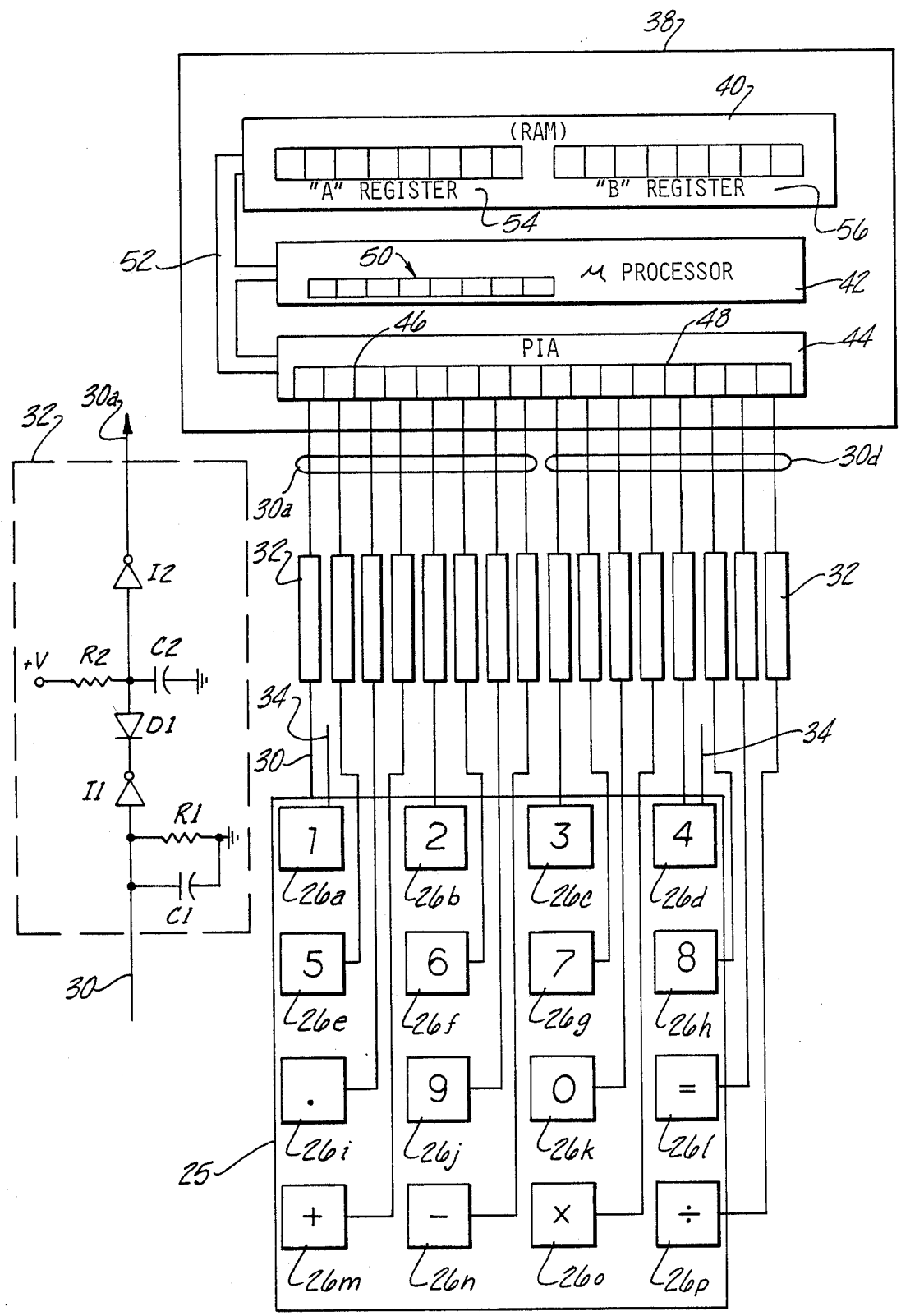
FIG. 3 is a combined diagrammatic and schematic view of the system of the present invention employing the preferred embodiment of the keyboard.
Figure 4:
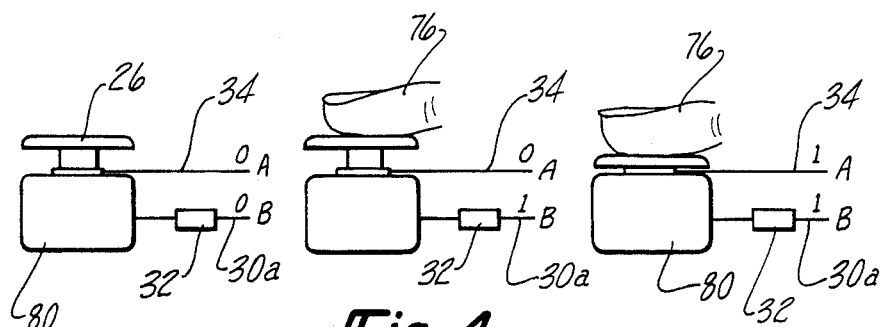
FIG. 4 displays three elevational views of a touchsensitive key employed in the keyboard dipicted in FIG. 3, and showing the key in three different states of operation.
Figure 5A:
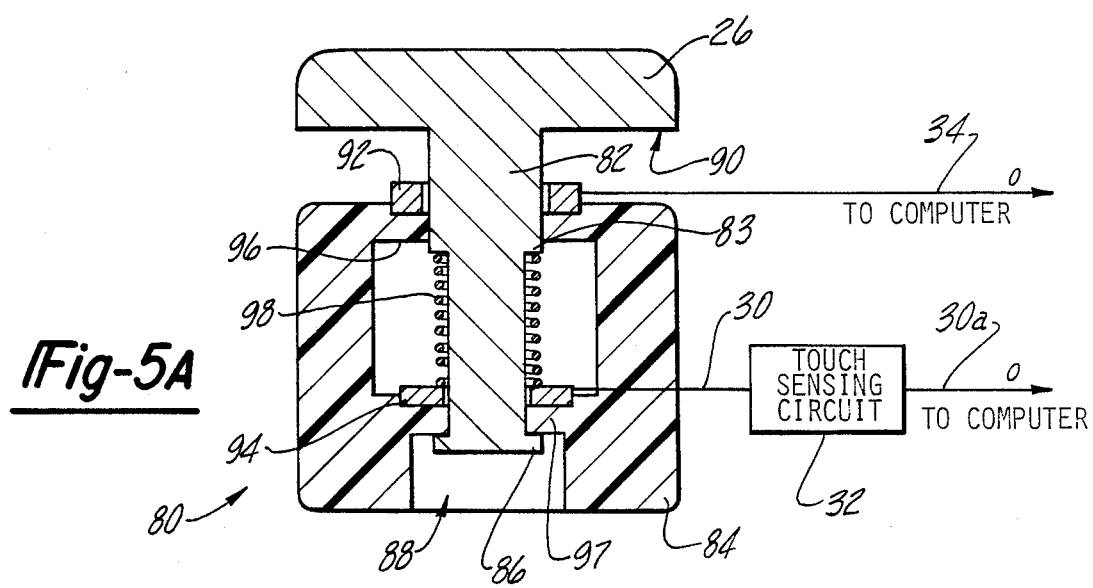
FIG. 5a is a cross-sectional view of the key shown in FIG. 4, in a raised standby position.
Figure 5B:
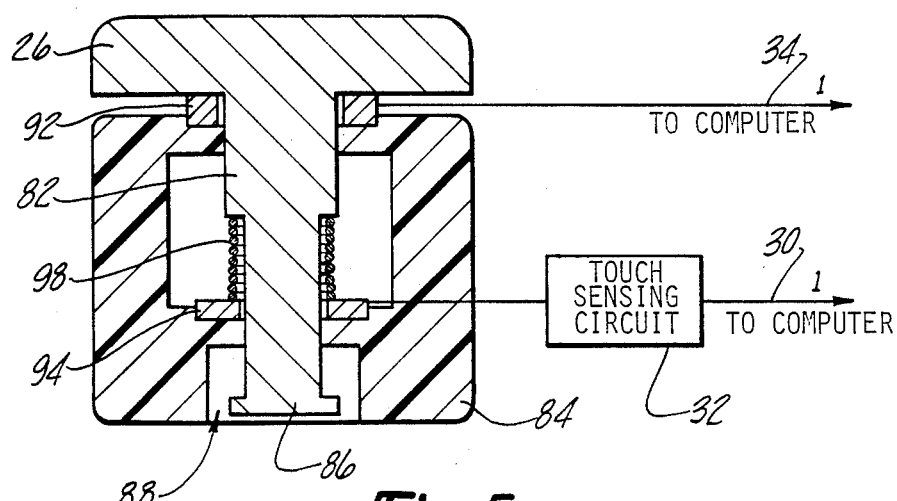
FIG. 5b is a view similar to FIG. 5a but depicting the key in a depressed, actuated position.

Attention is now directed to FIGS. 2, 3, 5a and 5b wherein the preferred form of the invention is depicted. As seen in FIG. 3, a matrix 25 of 16 keys 26a–26p is arranged in four rows and four columns thereof. As shown in FIGS. 4, 5A and 5B, each of the keys 26 includes a key 26 formed of conductive material such as metal, and a conductive key plunger 82 which actuates a switch 80. The switch 80 includes a substantially hollow, nonconductive switch body or housing 84 provided with a top wall 96 and bottom wall 97. The plunger 82 extends through openings in the top and bottom walls 86 and 97 and is provided with an annular shoulder 86 which bears against the lower wall 97 in a recess 88 at the bottom of the housing 84. Electrically conductive washers or rings 92, 94 are respectively mounted on the top and bottom wall 96, 97 and circumscribe the plunger 82. The inside diameter of the rings 92, 94 is greater than the diameter of the plunger 82 so as to be insulated by an air space from the plunger 82. A pair of electrical lead lines 30, 34 are respectively electrically connected to the conductive rings 94, 92.

A coil spring 98 formed of electrically conductive material is sleeved over a reduced diameter portion of the plunger 82 and is captured between a shoulder 83 of the plunger 82 and the conductive ring 94. It may thus be appreciated that the spring 98 normally biases plunger 82 and keypad 26 to a raised, standby position, and also completes an electrical circuit between the key 26 and a touch sensing circuit 32. This circuit is traceable through the conductive key pad 26, plunger 82, spring 98 and line 30 to the touch sensing circuit 32.

With the keypad 26 in its normal, fully raised position, prior to being touched by an operator's finger 76 as shown in the far left view of FIG. 4, the output of the touch sensing circuit 32 (line 30a) and line 34 are both low. However, upon contact of the key pad 26 by finger 76, a high signal or a "one" is output on line 30a by the touch sensing circuit 32 which responds to the initial engagement of the finger 76 with key pad 26.

Referring momentarily to FIG. 3, each of the touch sensing circuits 32 comprises a parallel RC network which includes a resistor R1 and capacitor C1 connected between ground and the input line 30. A diode D1 is connected in series between the input line 30 and output line 30a, along with a pair of inverters I1 and I2. A positive source of DC voltage V is applied to a capacitor C2 which is in turn connected with ground. The high signal produced by the voltage source V passing through resistor R2 is normally inverter by inverter I2 as a low signal on line 30a. However, upon engagement of the key pad 26 by the operator's finger 76, the signal input through inverter I2 is low, thus causing the output thereof to go high. A high signal remains present on line 30 until the operator removes his finger 76 from the key pad 26.

When the key pad 26 is depressed by the operator's finger 76, the lower surface 90 of the key pad 26 engages the conductive ring 92, thereby completing a circuit path from the upper surface of the key 26 through the ring 92 to the output line 34, thus producing a high signal on line 34. From the above, it is apparent that the switches 80 are bistate in operation and produce a first set of signals on line 30a upon initial engagement of the keys 26 by the operator's fingers 76, independently of the depression of the keys 26, and also produce a second set of signals on lines 34 when the keys 26 are depressed by the operator to their depressed, actuated positions.

The matrix 25 of the keys 26 is connected with a microcomputer system 38 by lines 30 and 34. Lines 34 are connected with the microcomputer 38 in a conventional manner, consequently, for sake of clarity only two of the lines 34 (associated with keys 26a and 26d) have been shown but are not depicted as being connected to the microcomputer 38 since the manner in which they are so connected and operate is conventional in the art.

The microcomputer 38 possesses all of the normal components including RAM, ROM, a CPU, etc. However, for purposes of this description, the significant elements of the microcomputer 38 comprise a microprocessor 42, a peripheral interface adapter (PIA) 44 and a RAM (random access memory) 40. The microprocessor 42, RAM 40 and PIA 44 are interconnected by a data bus 52 to permit data to be transferred therebetween. The PIA 44 includes first and second eight-bit parallel registers 46 and 48 which respectively include input ports connected with the input lines 30a. The storage locations of register 46 are respectively connected and associated with the keys in the left two columns of the matrix 25 (26a, 26b, 26e, 26f, 26i, 26j, 26m and 26n), while the storage locations of register 48 are respectively associated with and connected to the keys 26 in the right two columns of the matrix 25. Thus, there is provided a bit storage location associated with each of the keys 26 for storing a data bit when the corresponding key 26 is touched. It may therefore be appreciated that the data bits stored in the registers 46, 48 indicate the keys 26 which are being touched at any one point in time.

The microprocessor 42 sequentially transfers the data stored in registers 46 and 48 to its own accumulator register 50 and then transfers such data for storage in a corresponding eight-bit memory section or location 54, 56 in the RAM 40. The microprocessor 42 continuously reads data from registers 46 and 48 and writes such data into RAM 40 until no further bits are present in the registers 46 and 48, which of course, indicates that none of the keys 26 are any longer being touched.

The operation of the keyboard system shown in FIG. 3 is best understood by reference now to FIG. 2. One aspect of the present invention resides in the use of a touch sensitive keyboard in which the keys 26 may be sequentially actuated by touch thereof, merely by running a finger sequentially over the keys in the code to be actuated. It is to be understood that the keys 26 are preferably coplanar and substantially contiguous to each other, although the keys depicted in FIG. 3 show substantial separation therebetween in order to simplify the drawings.

For purposes of illustration, let it be assumed that a command code is to be generated which corresponds for example to a complete word, which requires actuation via touching of the bottom row of keys, i.e., 26m, 26n, 26o and 26p. Rather than employing four fingers to actuate all of these keys simultaneously, the same result may be used by sliding a single finger 76 across the bottom row of keys 26. The condition of the input registers 46 and 48 as well as the data stored in register locations 54 and 56 of the RAM are shown in the rows horizontally aligned with the matrix 25. The successive rows 58–74 of the matrix 25 sequentially depict the touching of the keys on the bottom row thereof. As shown at 58, with none of the keys 26 contacted by the operator, none of the storage locations in registers 46, 48 or memory locations 54 or 56 have any data bits stored therein. Upon contact of the first key 26m at 60, a bit is entered into the fifth most significant bit location in register 46 and the microprocessor 42 transfers this data bit into the corresponding memory section 54 of the RAM 40. At 62, it can be seen that the sliding of finger 76 results in simultaneous contact of switches 26m and 26n; under these conditions bits are entered into the first and fifth bit storage locations of register 46 and these bits are stored in the same relative positions in the memory section 54.

Continued movement of the finger 76 maintains contact with key 26n but terminates contact with key 26m; at this point, the only bit stored in registers 46 and 48 is that in the most significant bit position, however, note that the bit in the fifth position remains stored in memory section 54 of the RAM 40. At 66, it may be seen that the finger 76 simultaneously contacts keys 26n and 26o, resulting in the presence of bits in both registers 46 and 48, which are in turn stored in the corresponding positions in memory sections 54 and 56. Continued sliding movement of the finger 76 as shown at 68, 70 and 72 results in the generation of additional bits in the registers 46 and 48, and storing thereof in the memory sections 54 and 56. As shown at 74, when the finger 76 is lifted from the keys, no further data bits are present in the registers 46 and 48, however, the memory sections 54, 56 have stored therein a sixteen-bit, binary data word which corresponds to the information or function to be generated. This sixteen-bit data word may be employed to address another conventional memory (not shown) forming a part of the microcomputer 38 which defines a look-up table in which the information to be generated is stored. In effect, a selection period is provided during which each of the keys in a group thereof must be actuated in order to generate the necessary code, with at least one key being actuated at all times during the entire selection period. The microprocessor 42 senses the end of each selection period by sensing the absence of bits in registers 46, 48. The data word stored in the memory section 54, 56 is transferred for use as an address only after the end of the corresponding selection period. In the case of the generation of conventional alphanumeric information, the look-up tables will be preprogrammed with information in the form of common letters or numbers which is addressed by an eight bit ASCII code associated with the sixteen-bit keyboard input command. The final word, number or letter is then output to any suitable device such as a CRT or printer (not shown).

Figure 6:
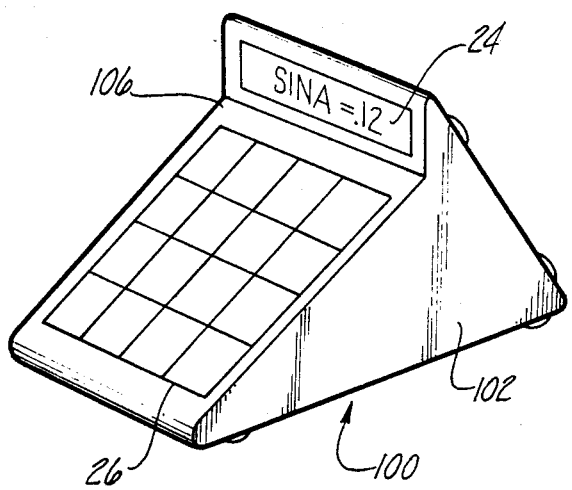
FIG. 6 is a perspective view of a portable keyboard module shown in a stationary position supported on a suitable surface.
Figure 7:
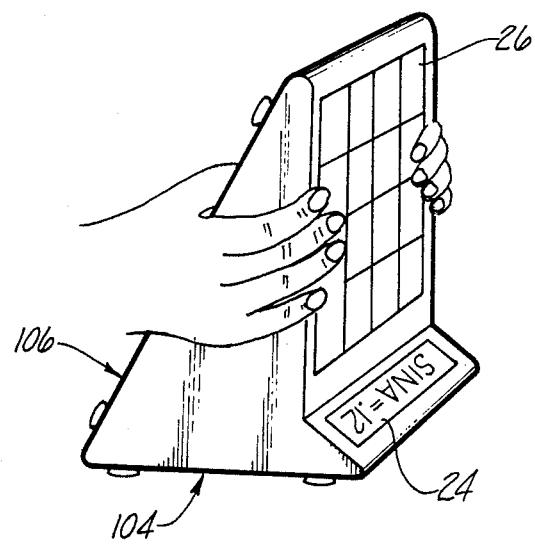
FIG. 7 is a perspective view of the keyboard module shown in FIG. 6 but showing the module in a second postition of use.

The information-generating system may be used in a variety of applications and devices. For example, as shown in FIGS. 6 and 7, the keyboard may be mounted on one flat face 106 of a trapezoidally-shaped housing 100, which is provided with a multiline, matrix-type readout 24 for displaying the information to be generated. The housing 100 includes a pair of side walls 102 connecting the flat face 106 with a bottom wall 106 and an end wall 104. The housing 100 may be positioned for use as a conventional keyboard by supporting the bottom 106, however, the housing 100 may be rotated 90 degrees so that the end wall 104 is supported on a suitable surface; in this latter position, the user's hands may be wrapped around the side walls 102 so that the fingers contact the keys 26.

The use of bistate switches 80 in connection with the matrix 25 of the keys 26 allows $2^{32}$ possible codes to be generated, while at the same time allowing the keyboard to be operated in a conventional manner as a calculator or the like. It should also be noted that various arrays of keys may be employed. For example, a matrix of $2 \times 4$ keys will allow generation of the numbers 1–10. A $2 \times 4$ matrix of keys would permit the generation of the letters a through z, while a $3 \times 4$ matrix would allow generation of upper case letters A through Z in addition to arabic numbers.

Figure 8:
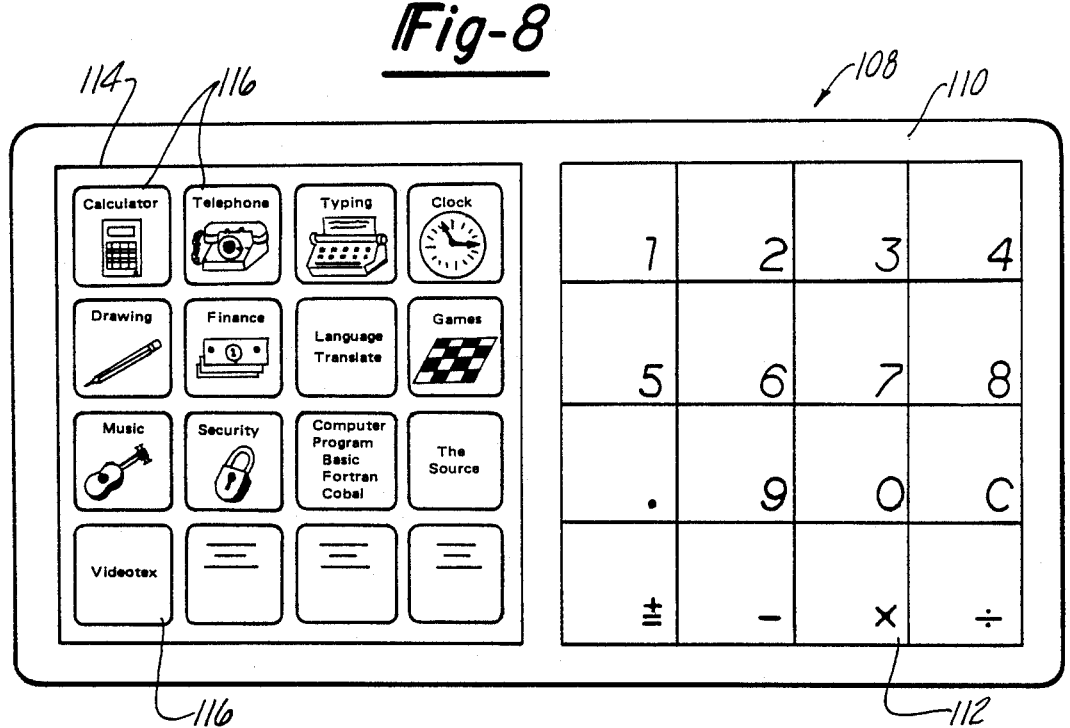
FIG. 8 is a plan view of an information processing device which forms an alternate embodiment of the present invention.

Reference is now made to FIG. 8 wherein an information processing device is displayed which forms still another alternate embodiment of the present invention. The device, generally indicated at 108 includes a housing or base 110 upon which there is mounted a $4 \times 4$ matrix of keys 112 and a high resolution display screen 114. The matrix of keys 112 may be of the type previously described hereinabove which uses either conventional or touch-sensitive switching circuits.

The screen 114 may be of the LED or LCD-type consisting of aligned row and columns of pixels (picture elements). With the device initially energized, a menu is displayed on the screen 114 and shown in FIG. 8 which consists of a matrix of menu choice blocks 116 which correspond in number and position to the keys 112. Each of the blocks 116 represents a selectable mode of operation for the device 108, which will be determined primarily by software and in some cases hardware to which the device 108 may be connected. The electrical circuits and software for performing the particular mode of operation represented by the blocks 116 will vary according to the user's particular requirements and are conventional in the art, consequently, the details thereof need not be described herein. However, one suitable circuit for use with the device 108 is shown in FIGS. 3, 4 and 5, and has been previously described.

Figure 9:
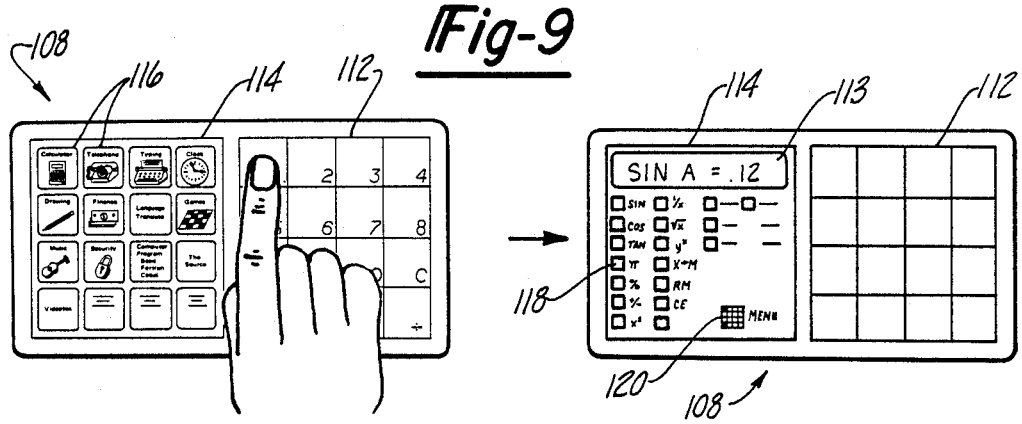
FIG. 9 is a plan view similar to FIG. 8, but showing the change in the display screen upon selection of a specific mode of operation from a displayed menu.
Figure 10:
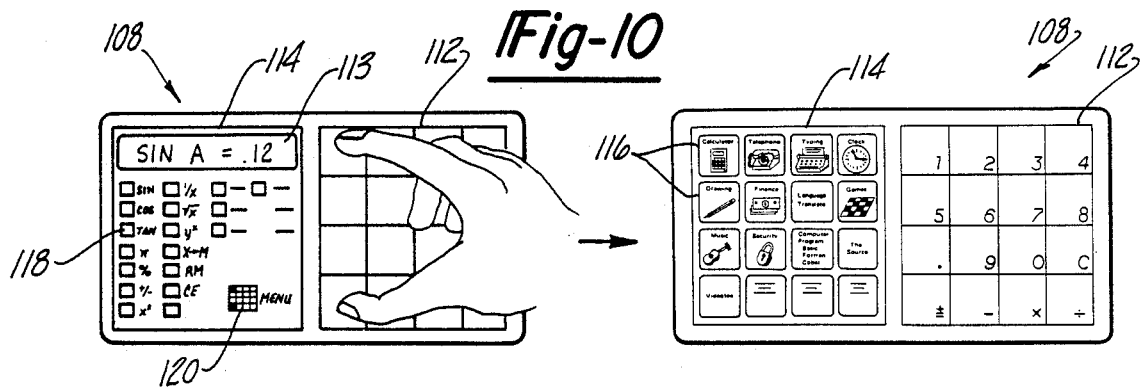
FIG. 10 is a plan view similar to FIG. 9, but showing the change in the display screen upon request of a menu.

In order to select a particular mode of operation, the user depresses the key 112 corresponding in position to the mode block 116 shown on the screen 114. For example, as shown in FIG. 9, in order to select a calculator mode of operation, the user depresses the key 112 labeled as "1" as shown in the left-hand side of FIG. 9, whereupon the screen 114 under computer control converts the keyboard 112 for calculator use and displays a set of calculating indicia on the screen 114, shown in the right-hand view of FIG. 9. A portion of the screen 114 is blocked out to provide an alphanumeric display 113 which displays information processed by the keys 112. A set of mathematical functions along with corresponding code blocks 118, each consisting of a 4×4 matrix of squares, is likewise displayed. The code blocks 118 and their associated mathematical functions are identical to those previously described with reference to FIGS. 1–3. Also displayed on the screen 114 is a code block 120 showing the keys 112 which must be depressed in order to recall on the screen 114 the selection menu. Thus, as shown in the left-hand side of FIG. 10, the user may recall the menu simply by depressing the top and bottom keys in the first row thereof, whereupon, as shown in the right-hand view of FIG. 10 the menu reappears.

The device 108 may operate in a stand-alone manner or may be connected with existing computer systems.

The system of the present invention, including the novel keyboard, may be employed in a variety of applications including typewriters, appliances, computers, calculators, word processing systems, locking devices, security systems, communicators for the handicapped (e.g. braille typing), telephone dialing systems and various similar applications which require a man-machine interface for generating information. By way of example, the present invention may be effectively employed in a telephone dialing system in the following manner. The system may be interconnected with a multi-line monitor, such as a CRT, and a conventional telephone. The telephone numbers of the parties to be dialed are stored in a look-up table in a predefined order such as alphabetically. Knowing the first letter of the name of the party to be called, the user may call up the file for the letter of the alphabet of interest. Displayed on the monitor for that file would be the names of the parties to be called and a matrix code for each name which, if keyed into the keyboard, will result in automatic dialing of the telephone number of that party.

In a similar manner, the system of the present invention is well-adapted for use as a language translator. The operator need only code in the word to be translated and the code of the language into which it is to be translated whereupon the translated word is displayed.

Figure 11:
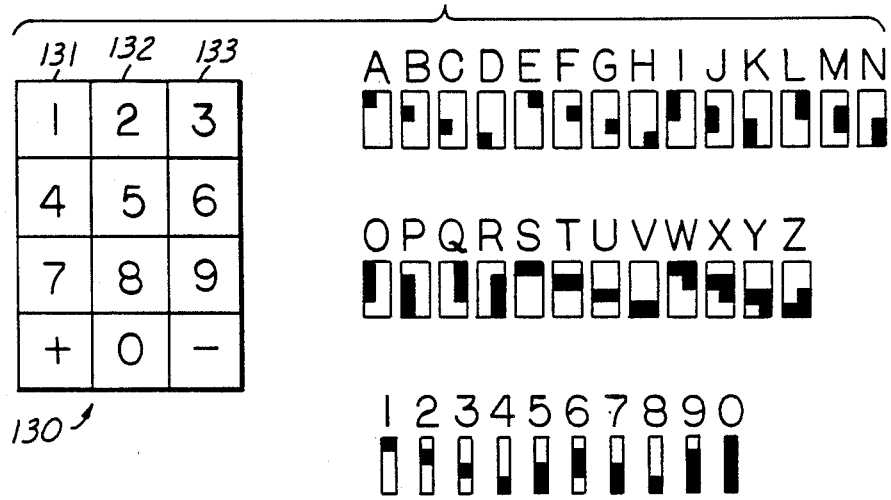
FIG. 11 shows an exemplary 4×3 keypad matrix and diagrams keypad depressions corresponding to alphabetic and numeric characters in one mode of operation.

Yet another preferred embodiment of the present invention will now be described with reference to FIGS. 11–13. Referring to FIG. 11, a keypad 130 is shown arranged in a 3×4 matrix including columns 131, 132, and 133. Keypad 130 may be operated in a first mode wherein each key represents the digit shown thereon as in a calculator or telephone type of keypad. In a segregated mode of operation, columns 131 and 132 may be used to generate alphabetic information while column 133 may be used to generate numeric information by using the codes shown in FIG. 11. The subset of keys corresponding to column 133 may be distinguished from the subset of columns 131 and 132 by merely being an edge column or may be physically separated from the columns or have a different color from the other columns. Thus, an operator may efficiently enter data using keypad 130 in both segregated and non-segregated modes of operation.

Figure 12:
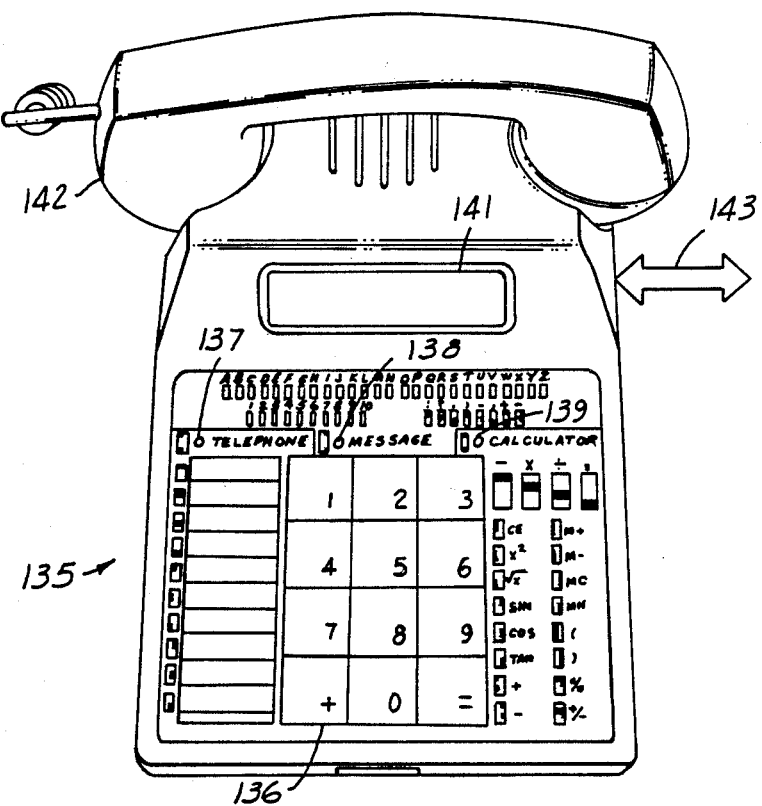
FIG. 12 is a perspective view of an information processing device according to another embodiment of the present invention.

Reference is now made to FIG. 12 wherein an information processing device 135 for operating in both segregated and non-segregated modes is shown. Device 135 includes a 3×4 keypad matrix 136 having its rightmost column distinguished from the others by a difference in shading or color. Device 135 is operable in a telephone mode, a message mode and a calculator mode of which the telephone mode and the calculator mode are non-segregated modes and the message mode is a segregated mode. Device 135 includes indicators 137, 138 and 139 (e.g. LEDs) to show the mode in which the device is operating. A display 141 is provided to display information generated by device 135. A handset 142 is provided for operation as a telephone, and a communications link 143 is provided for external connection to a telephone line, for example.

Each mode of device 135 may be selected by depressing the keys indicated by the legend near each respective indicator light 137–139. Legends are further provided for displaying the key sequences for various character sets.

A microprocessor-based system for implementing the device of FIG. 12 is shown in FIG. 13. A microprocessor 144 is coupled to a system bus 145. Associated with microprocessor 144 is a keyboard module 146 including key switches, mode indicators and symbol legends as described with reference to FIG. 12. This system also includes a liquid crystal display (LCD) 141 for displaying information, a read-only memory (ROM) 150 and a random access memory (RAM) 151 which are well-known in the art. A power supply circuit 148 is adapted to be connected to AC power and supplies the proper DC voltage to various parts of the microprocessor system. Also coupled to system bus 145 are a modem/dialer/receiver 153 and an interface 152. Modem 153 is connected to a handset 154 and is adapted to be connected to a phone line. Interface 152 (e.g. an RS 232 interface) and modem 153 are adapted to send and receive digital data signals over the phone line. Modem 153 is also operable as a typical telephone in conjunction with handset 154 and keyboard module 146 through microprocessor 144 and system bus 145.

An individual key structure useful in various embodiments of the present invention will now be described with reference to FIGS. 14–21. In the present system wherein certain characters are generated by depression of more than one key, it is desirable to have key actuation with minimal key travel and minimal compression force. Referring to FIG. 14, an individual key 159 has a rectangular-shaped body portion 160 having a length L and width W. A first leg portion 161 and a second leg portion 162 extend along the bottom surface of the body portion 160 and extend beyond one orthogonal edge of the body portion 160 by a distance greater than L. Leg portion 162 is aligned with one lateral edge of body portion 160 while the outside edge of leg portion 161 is recessed from the outside lateral edge of body portion 160 by a R which is slightly greater than the orthogonal thickness T of leg portion 162. A pair of coaxial bores 163 and 164 are provided at the ends of leg portions 161 and 162 at a distance from body portion 160 greater than distance L.

FIG. 15 is a perspective view showing the underside of key 159. Leg 161 includes a projection 167 extending along the bottom surface of body portion 160 toward leg portion 162 in order to form a groove 165 between legs 161 and 162, the thickness of groove 165 being slightly greater than the orthogonal thickness of leg portion 161. An alignment pin 166 protrudes from the projection portion 167 of leg 161 parallel to leg 161. Thus, key 159 is adapted to be operated using a hinge pin projecting through bores 163 and 164 with alignment pin 166 fitting into a guiding slot.

The structure of key 159 is such that it may be nested with an identically configured key in constructing a keypad. FIG. 16 shows a pair of identical keys 170 and 171 which are lined up for nesting. FIG. 17 shows keys 170 and 171 in their nested position.

Referring now to FIG. 18, a chassis 172 is shown for receiving a 3×4 matrix of keys each having the structure of key 159. Chassis 172 has a plurality of hinge pin tracks 173 for receiving hinge pins 176 to pass through nested pairs of key legs. Chassis 172 also contains a plurality of alignment guide slots 174 for receiving the alignment pins of the keys. A plurality of holes 175 provide means for receiving a plurality of switches which will be actuated by the keys.

FIG. 19 shows the key and chassis assembly with some of the keys assembled to chassis 172. A plurality of hinge pins 176 are shown extending through tracks 173 and the bores of selected keys. The recessed location of leg 161 of key 159 allows adjacent pairs of nested keys to share a hinge pin. Thus, the central hinge pin is used to secure the leg portions of the keys labeled "1" and "+", for example.

Figure 20:
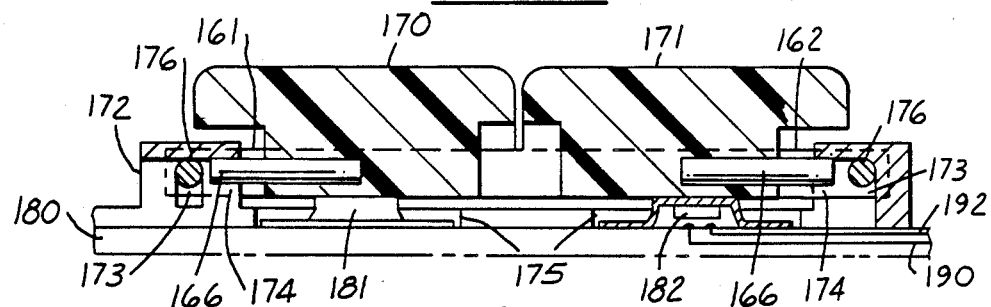
FIG. 20 is a cross-section of FIG. 19 along lines 20—20.

The cross-sectional view of FIG. 20 shows chassis 172 located over a printed circuit board 180. A plurality of flexible switch elements 181 are each located in a respective hole 175. A conductor bridge 182 is attached to the underside of each respective element 181 such that each key depression completes an electrical circuit between conductor runs 190 and 192 on circuit board 180 through a respective conductor bridge 182.

Figure 21:
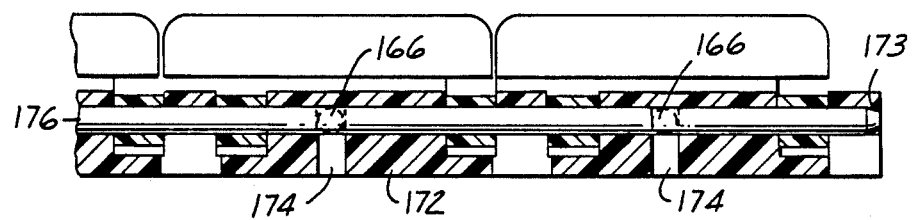
FIG. 21 is a cross-section of FIG. 19 along lines 21—21.

FIG. 21 shows a cross-sectional view along a hinge pin track 173. Alignment guide slots 174 are shown to receive alignment pins 166.

From the foregoing, it is apparent that the present system provides for the reliable accomplishment of the objects of the invention and does so in particularly economical and efficient manner. It is recognized, of course, that those skilled in the art may make various modifications or additions to the preferred embodiment chosen to illustrate the invention without departing from the spirit and scope of the present contribution to the art. Accordingly, it is to be understood that the protection sought and to be afforded hereby should be deemed to extend to the subject matter claimed and all equivalents thereof fairly within the scope of the invention.

What is claimed is:

1. A key comprising:
 a substantially rectangular-shaped body portion for receiving a depression force on the top surface thereof;
 a first leg portion extending along the bottom surface of said body portion having an outside edge substantially aligned with one outside lateral edge of said body portion, said first leg portion extending beyond one orthogonal edge of said body portion by a distance greater than the lateral edge dimension of said body portion, said first leg portion having a bore at the end thereof having its axis substantially parallel to said one orthogonal edge and at a distance from said one orthogonal edge greater than the lateral edge dimension of said body portion, said first leg portion having a bore at the end thereof having its axis substantially parallel to said one orthogonal edge and at a distance from said one orthogonal edge greater than said lateral edge dimension; and
 a second leg portion extending along said bottom surface of said body portion having an outside edge recesses from the opposite outside lateral edge of said body portion by a distance slightly greater than the orthogonal thickness of said first leg portion, said second leg portion extending beyond said one orthogonal edge by a distance substantially equal to the extension of said first leg portion and having a bore coaxial with the bore of said first leg portion, said second leg portion further including a projection extending along said bottom surface of said body portion for a distance toward said first leg portion which leaves a groove between said first leg portion and said projection which has an orthogonal thickness slightly greater than the orthogonal thickness of said second leg portion.

2. The key of claim 1 further comprising an alignment pin protruding from said projection in a direction parallel to, and opposite to the direction of said leg portions.

3. A key and chassis assembly comprising:
 at least one pair of actuatable keys, each of said keys comprising a substantially rectangular-shaped body portion for receiving a depression force on the top surface thereof, a first leg portion extending along the bottom surface of said body portion having an outside edge substantially aligned with one outside lateral edge of said body portion, said first leg portion extending beyond one orthogonal edge of said body portion by a distance greater than the lateral edge dimension of said body portion, said first leg portion having a bore at the end thereof having its axis substantially parallel to said one orthogonal edge and at a distance from said one orthogonal edge greater than said lateral edge dimension, a second leg portion extending along said bottom surface of said body portion having an outside edge recessed from the opposite outside lateral edge of said body portion by a distance slightly greater than the orthogonal thickness of said first leg portion, said second leg portion extending beyond said one orthogonal edge by a distance substantially equal to the extension of said first leg portion and having a bore coaxial with the bore of said first leg portion, said second leg portion further including a projection extending along said bottom surface of said body portion toward said first leg portion for a distance which leaves a groove between said first leg portion and said projection having an orthogonal thickness slightly greater than the orthogonal thickness of said second leg portion, and an alignment pin protruding from said projection in a direction parallel to, and opposite to the direction of, said leg portions;

a chassis having guide holes coaxially aligned with said bores, guide slots for receiving said alignment pins and means for receiving a plurality of switches to be activated by said keys; and a plurality of hinge pins extending through said coaxial bore and guide holes.

4. The assembly of claim 3, including a plurality of nested key pairs arranged in a matrix and wherein each key pair shares at least one hinge pin with its vertical and horizontal neighboring nested key pairs.

* * * * *